United States Patent
Rode

(10) Patent No.: US 10,718,368 B2
(45) Date of Patent: *Jul. 21, 2020

(54) LOCK NUT WITH OFFSET RETAINING RING

(71) Applicant: TEMPER AXLE PRODUCTS CORPORATION, Fonda, NY (US)

(72) Inventor: John E. Rode, Fonda, NY (US)

(73) Assignee: TEMPER AXLE PRODUCTS CORPORATION, Fonda, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/058,561

(22) Filed: Aug. 8, 2018

(65) Prior Publication Data

US 2019/0048917 A1 Feb. 14, 2019

Related U.S. Application Data

(63) Continuation of application No. 15/671,604, filed on Aug. 8, 2017, now Pat. No. 10,107,324.

(51) Int. Cl.
| | |
|---|---|
| *F16B 39/10* | (2006.01) |
| *F16B 39/12* | (2006.01) |
| *F16B 39/282* | (2006.01) |
| *F16B 21/18* | (2006.01) |
| *F16B 39/32* | (2006.01) |
| *B60B 27/00* | (2006.01) |
| *B60B 27/02* | (2006.01) |

(52) U.S. Cl.
CPC ........ *F16B 39/103* (2013.01); *B60B 27/0078* (2013.01); *F16B 21/183* (2013.01); *F16B 39/10* (2013.01); *F16B 39/12* (2013.01); *F16B 39/282* (2013.01); *F16B 39/32* (2013.01); *B60B 27/02* (2013.01); *B60B 2900/3312* (2013.01)

(58) Field of Classification Search
CPC ....................................... F16B 39/10
USPC .................. 411/119, 120, 221, 926
See application file for complete search history.

(56) References Cited

U.S. PATENT DOCUMENTS

| | | | |
|---|---|---|---|
| 518,328 A | 4/1894 | Oakey | |
| 578,276 A * | 3/1897 | Strauss | .............. F16B 39/10 411/221 |
| 850,787 A * | 4/1907 | Roberts | .............. F16B 39/10 411/221 |

(Continued)

FOREIGN PATENT DOCUMENTS

| | | |
|---|---|---|
| AU | 2006200842 A1 | 7/2006 |
| AU | 2007200331 A1 | 8/2007 |

(Continued)

OTHER PUBLICATIONS

"STEMCO Pro-Torq® Advanced Axle Spindle Nuts 09-571-0006," Instruction guide, Copyright Aug. 2003, 2 pages.

(Continued)

*Primary Examiner* — Flemming Saether
(74) *Attorney, Agent, or Firm* — Heslin Rothenberg Farley & Mesiti P.C.; Nicholas Mesiti; Kristian E. Ziegler

(57) ABSTRACT

A lock nut system includes a nut having a retaining member which includes a keeper having locking teeth configured to engage with the lock nut teeth. The locking teeth are offset in either a clockwise or counterclockwise direction to allow the lock nut to be locked into position on the shaft without further rotation or other adjustment of the nut.

22 Claims, 13 Drawing Sheets

(56) References Cited

U.S. PATENT DOCUMENTS

| | | | | |
|---|---|---|---|---|
| 1,197,429 A | * | 9/1916 | Barnard | F16B 39/04 411/209 |
| 1,352,643 A | | 9/1920 | Young | |
| 1,366,273 A | | 1/1921 | Nettlefold | |
| 1,373,489 A | | 4/1921 | Cochran | |
| 1,384,655 A | | 7/1921 | Allmon | |
| 1,440,938 A | | 1/1923 | Sieroslawski | |
| 1,755,807 A | | 4/1930 | Boles | |
| 1,758,515 A | | 5/1930 | Heiermann | |
| 1,813,640 A | | 7/1931 | Rossetti | |
| 2,301,786 A | | 11/1942 | Millermaster | |
| 2,426,219 A | | 8/1947 | Jackson | |
| 2,532,141 A | | 11/1950 | Barkan et al. | |
| 2,553,620 A | | 5/1951 | Yeazell | |
| 2,755,698 A | | 7/1956 | Wurzel | |
| 2,762,112 A | | 9/1956 | Kylen | |
| 2,769,360 A | | 11/1956 | Cottrell | |
| 2,813,732 A | | 11/1957 | Hird | |
| 3,144,909 A | | 8/1964 | Hart et al. | |
| 3,241,409 A | | 3/1966 | Raptis | |
| 3,316,952 A | | 5/1967 | Hollinger | |
| 3,390,445 A | | 7/1968 | Sova, Sr. | |
| 3,464,474 A | | 9/1969 | Jansen | |
| 3,480,300 A | | 11/1969 | Jeffrey et al. | |
| 3,522,830 A | | 8/1970 | Blizard | |
| 3,566,721 A | | 3/1971 | Nockleby | |
| 3,581,609 A | | 6/1971 | Greenwood | |
| 3,620,108 A | | 11/1971 | Door | |
| 3,662,449 A | | 5/1972 | Hashimoto | |
| 3,664,226 A | | 5/1972 | Gonzalez | |
| 3,678,981 A | | 7/1972 | Heyworth | |
| 3,705,524 A | | 12/1972 | Greenwood | |
| 3,742,568 A | | 7/1973 | Hahlbeck | |
| 3,762,455 A | | 10/1973 | Anderson, Jr. | |
| 3,844,323 A | | 10/1974 | Anderson, Jr. | |
| 3,986,750 A | | 10/1976 | Trent et al. | |
| 4,004,338 A | | 1/1977 | Breitbach | |
| 4,019,824 A | | 4/1977 | Percy | |
| 4,048,897 A | | 9/1977 | Price, Jr. | |
| 4,054,999 A | | 10/1977 | Harbottle | |
| 4,090,545 A | * | 5/1978 | Ritter, Jr. | F16B 39/04 411/209 |
| 4,210,372 A | | 7/1980 | McGee et al. | |
| 4,305,438 A | | 12/1981 | Spinosa et al. | |
| 4,436,468 A | | 3/1984 | Ozaki et al. | |
| 4,476,750 A | | 10/1984 | Murphy | |
| 4,593,924 A | | 6/1986 | Cabeza | |
| 4,642,866 A | | 2/1987 | Murtaugh | |
| 4,689,865 A | | 9/1987 | Chamblee | |
| 4,812,094 A | | 3/1989 | Grube | |
| 4,958,941 A | | 9/1990 | Imanari | |
| 4,971,501 A | | 11/1990 | Chavez | |
| 5,007,313 A | | 4/1991 | Jeromson, Jr. et al. | |
| 5,011,306 A | | 4/1991 | Martinie | |
| 5,058,424 A | | 10/1991 | O'Hara | |
| 5,070,621 A | | 12/1991 | Butler et al. | |
| 5,125,156 A | | 6/1992 | Witte | |
| 5,129,156 A | | 7/1992 | Walker | |
| 5,180,265 A | | 1/1993 | Wiese | |
| 5,251,995 A | | 10/1993 | Chi | |
| 5,348,349 A | | 9/1994 | Sloane | |
| 5,349,736 A | | 9/1994 | Rubino et al. | |
| 5,362,111 A | | 11/1994 | Harbin | |
| 5,366,300 A | | 11/1994 | Deane et al. | |
| 5,402,560 A | | 4/1995 | Rode | |
| 5,442,854 A | | 8/1995 | Koltookian et al. | |
| 5,533,849 A | | 7/1996 | Burdick | |
| 5,535,517 A | | 7/1996 | Rode | |
| 5,542,167 A | | 8/1996 | Nakamoto | |
| 5,573,311 A | | 11/1996 | Clohessy | |
| 5,597,058 A | | 1/1997 | Ewer | |
| 5,749,386 A | | 5/1998 | Samuel, Jr. | |
| 5,779,419 A | | 7/1998 | Kellström et al. | |
| 5,877,433 A | | 3/1999 | Matsuzaki et al. | |
| 5,882,044 A | | 3/1999 | Sloane | |
| 5,934,853 A | | 8/1999 | Junkers | |
| 6,010,290 A | * | 1/2000 | Slesinski | F16B 39/108 411/226 |
| 6,042,273 A | | 3/2000 | Thrasher | |
| 6,058,767 A | | 5/2000 | Calvin | |
| 6,065,920 A | | 5/2000 | Becker et al. | |
| 6,095,735 A | | 8/2000 | Weinstein et al. | |
| 6,135,642 A | | 10/2000 | Burch | |
| 6,145,417 A | | 11/2000 | Bates et al. | |
| 6,186,032 B1 | | 2/2001 | Raines | |
| 6,257,105 B1 | | 7/2001 | Lin | |
| 6,286,374 B1 | | 9/2001 | Kudo et al. | |
| D458,099 S | | 6/2002 | Ruszczyk | |
| 6,415,489 B1 | | 7/2002 | Martins et al. | |
| 6,471,774 B1 | | 10/2002 | Krueger | |
| 6,520,710 B2 | | 2/2003 | Wells | |
| 6,598,500 B1 | | 7/2003 | Chivington | |
| 6,601,503 B2 | | 8/2003 | Scholzig et al. | |
| 6,622,397 B1 | | 9/2003 | Knoble | |
| 6,637,297 B1 | | 10/2003 | Mlynarczyk | |
| 6,665,918 B1 | | 12/2003 | Williams | |
| 6,736,544 B1 | | 5/2004 | DeWald | |
| 6,749,386 B2 | | 6/2004 | Harris | |
| 6,783,137 B2 | | 8/2004 | Nagreski et al. | |
| 6,857,665 B2 | | 2/2005 | Vyse et al. | |
| 6,886,227 B1 | | 5/2005 | Hedrick | |
| 6,971,802 B2 | | 12/2005 | Vezina | |
| 6,976,816 B2 | | 12/2005 | Slesinksi et al. | |
| 6,976,817 B1 | | 12/2005 | Grainger | |
| 6,983,677 B1 | | 1/2006 | Engel | |
| 6,988,832 B2 | | 1/2006 | DeWachter et al. | |
| 6,993,852 B2 | | 2/2006 | Russell et al. | |
| 7,055,413 B1 | | 6/2006 | Wang | |
| 7,194,936 B2 | | 3/2007 | Engel et al. | |
| 7,226,259 B2 | | 6/2007 | Harris | |
| 7,270,509 B2 | | 9/2007 | Disantis et al. | |
| 7,303,367 B2 | | 12/2007 | Rode | |
| 7,343,836 B1 | | 3/2008 | Ward | |
| 7,346,985 B1 | | 3/2008 | Strait | |
| 7,389,579 B2 | | 6/2008 | Rode | |
| 7,428,779 B2 | | 9/2008 | Smith et al. | |
| 7,448,301 B1 | | 11/2008 | Cronin | |
| 7,559,135 B2 | | 7/2009 | Rode | |
| 7,625,164 B2 | | 12/2009 | Rode | |
| 7,757,586 B2 | | 7/2010 | Winker et al. | |
| 7,927,052 B1 | * | 4/2011 | Varden | F16B 39/108 411/197 |
| 8,006,573 B1 | | 8/2011 | Rode | |
| 8,016,531 B2 | | 9/2011 | White et al. | |
| 8,172,496 B2 | | 5/2012 | Vile et al. | |
| 8,292,373 B2 | | 10/2012 | Rieger et al. | |
| 8,316,530 B2 | | 11/2012 | Rode | |
| 8,328,486 B2 | | 12/2012 | Cox | |
| 8,347,471 B2 | | 1/2013 | Wang | |
| 8,359,733 B2 | | 1/2013 | Rode | |
| 8,534,770 B2 | | 9/2013 | White | |
| 8,650,757 B2 | | 2/2014 | Rode | |
| D706,104 S | | 6/2014 | Mooney | |
| 8,904,646 B2 | | 12/2014 | Rode | |
| 8,919,227 B2 | | 12/2014 | Tseng | |
| 8,961,090 B2 | | 2/2015 | Rode | |
| 9,156,150 B2 | | 10/2015 | Wang | |
| 9,200,672 B2 | | 12/2015 | Rode | |
| 9,200,673 B2 | | 12/2015 | Rode | |
| 9,217,461 B2 | | 12/2015 | Rode et al. | |
| 9,566,699 B1 | | 2/2017 | Rode et al. | |
| 9,574,612 B2 | | 2/2017 | Rode | |
| 9,574,962 B2 | | 2/2017 | Preuss et al. | |
| 9,587,667 B2 | | 3/2017 | Rode et al. | |
| 9,599,164 B1 | | 3/2017 | Rode et al. | |
| 9,618,049 B2 | | 4/2017 | Rode | |
| 9,651,094 B2 | | 5/2017 | Rode | |
| D789,169 S | | 6/2017 | Rode et al. | |
| 9,764,453 B1 | | 9/2017 | Rode et al. | |
| 9,797,441 B2 | | 10/2017 | Rode | |
| 9,850,943 B1 | | 12/2017 | Rode | |
| 9,909,609 B2 | | 3/2018 | Rode et al. | |
| 2004/0089113 A1 | | 5/2004 | Morgan | |
| 2017/0268572 A1 | | 9/2017 | Rode et al. | |

(56) References Cited

U.S. PATENT DOCUMENTS

| | | | |
|---|---|---|---|
| 2017/0320203 | A1 | 11/2017 | Rode et al. |
| 2017/0326714 | A1 | 11/2017 | Rode et al. |
| 2018/0045244 | A1 | 2/2018 | Rode |

FOREIGN PATENT DOCUMENTS

| | | | |
|---|---|---|---|
| AU | 2007234534 A1 | 12/2007 | |
| AU | 2008201252 A1 | 4/2008 | |
| AU | 2011204889 A1 | 8/2011 | |
| CA | 2576337 A1 | 7/2007 | |
| CA | 2863789 A1 | 7/2007 | |
| CA | 2993836 A1 | 7/2007 | |
| CA | 2537611 A1 | 8/2007 | |
| CA | 2704865 A1 | 12/2010 | |
| CN | 102699875 A | 10/2012 | |
| DE | 555123 C | 7/1932 | |
| DE | 1962186 A1 | 6/1970 | |
| DE | 3905385 A1 | 8/1990 | |
| DE | 102007005160 A1 | 8/2007 | |
| DE | 102006011122 A1 | 9/2007 | |
| DE | 102010017610 A2 | 3/2011 | |
| EP | 1367299 A2 | 12/2003 | |
| EP | 3122512 A1 | 2/2017 | |
| GB | 990553 A | 4/1965 | |
| GB | 2286231 A | 8/1995 | |
| GB | 2434621 A | 8/2007 | |
| GB | 2435499 B | 1/2008 | |
| GB | 2445501 A | 7/2008 | |
| GB | 2471365 A | 12/2010 | |
| IT | 1401730 B1 | 8/2013 | |
| WO | 02/08618 A1 | 1/2002 | |
| WO | 2015/147903 A1 | 10/2015 | |

OTHER PUBLICATIONS

"Timkin Products-Bearings," vol. 1, Issue 6; entitled "Why Oscillate or Rotate a Bearing", 2 pages, [http://www.timken.com/products/bearings/techtips/tip6.asp].

Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/Vol6No3.pdf#search='Bearing%20Preloadl.

"Forming and Shaping Processes Compaction and Sintering (Pulvepresning)," Copyright Institut for Precesteknik Danmarks Tekniske Universitet 1996, (http://www.ipt.dtusdk/-ap/ingpro/forming/ppm/htm).

STEMCO, PRO-TORQ, An Axle Spindle Nut System for Today's Fleets. Mar. 2003; download from http://www.stemco.com, pp. 38-41.

STEMCO, PRO-TORQ, An Axle Spindle Nut System for Today's Fleets. Mar. 2003; download from http://www.stemco.com, pp. 57-64.

What is Powder Metallurgy? Dec. 2004, 2 pages. (https://www.mpiforg/technology/whatis.html).5011306.

Stemco, Quick Reference Catalog 572-0011 Rev. Date Apr. 2010.

Stemco—Pro-Torq, Axle Spindle Nuts, An Axle Spindle Nut System for Today's Commercial Fleets (http://www.stemco.com/product/pro-torz-axle-spindle-nuts/.

"STEMCO Pro-Torq(R) 571-2970," Copyright 2005 STEMCO LP, 2 pages.

International Search Report and Written Opinion from Corresponding PCT International Application No. PCT/US2014/050386 filed Aug. 8, 2015, completed and dated Dec. 26, 2014.

Search Report for related application GB0701360.0.

Examiner's Report for related application AU2007200331.

GB Intellectual Property Office Search Report Under Section 17, dated Aug. 25, 2010, from corresponding GB Application No. 1008927.4.

Rode, U.S. Appl. No. 15/671,604, filed Aug. 8, 2017.

Mesiti, U.S. Appl. No. 16/025,293, filed Jul. 2, 2018.

Rode, U.S. Appl. No. 15/482,389, filed Apr. 7, 2017.

Rode, U.S. Appl. No. 15/482,395, filed Apr. 7, 2017.

Rode, U.S. Appl. No. 15/482,413, filed Apr. 7, 2017.

Rode, U.S. Appl. No. 15/813,889, filed Nov. 15, 2017.

Rode, U.S. Appl. No. 15/928,911, filed Mar. 22, 2018.

Rode, et al., International PCT Application No. PCT/US2018/026525 filed on Apr. 6, 2018.

International Search Report and Written Opinion of the International Searching Authority for International PCT Application No. PCT/US2018/026525 dated Jul. 30, 2018.

Rode, U.S. Appl. No. 16/058,654, filed Aug. 8, 2018.

* cited by examiner

LOCK NUT WITH OFFSET RETAINING RING

CROSS REFERENCE TO RELATED APPLICATION

This application is a Continuation Application of U.S. Non-provisional application Ser. No. 15/671,604, filed on Aug. 8, 2017, the entire disclosure of which is hereby incorporated herein by reference.

TECHNICAL FIELD

This invention relates, generally, to fasteners, and more particularly, to lock nuts having retaining rings used for installing wheel hub and bearing assemblies on shafts such as axles or spindles, or for inhibiting relative movement of shafts engaged with such nuts.

BACKGROUND ART

Lock nut systems are often connected to shafts and utilized to inhibit rotation of the retaining nut relative to such shafts. For example, such systems are often utilized on motor vehicles including axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft. Such locking members are often made of stamped sheet metal.

In certain types of lock nuts the nut is locked into place on a shaft, such as an axle or spindle, by placing a retaining member into a recess within the nut. The retaining member or a keeper connected to the retaining member may have a plurality of teeth which interlock with teeth of the nut. Also, the retaining member or keeper may have a protrusion such as a key which interlocks with the shaft. To lock the nut on the shaft the protrusion or key must interlock with the shaft and the teeth of the retaining member or keeper interlocks with the teeth on the nut. However, if the nut is threaded onto the shaft at a specified torque, the nut may need to be rotated to adjust the position of the nut teeth so that they mesh with the teeth of the retaining member or keeper while the protrusion or key interlocks with the shaft. The adjustment of the nut by such rotation will, however, change the torque and resultant force applied by the nut onto the bearing on the shaft which the nut retains and contacts. Such a change in torque may not be desirable.

Thus, a need exists for lock nut systems which allow the retaining member to lock the nut into position without necessarily requiring additional rotation of the nut, and thus no significant change in the torque applied to the nut.

SUMMARY OF THE INVENTION

In accordance with the principles of the present invention, a lock nut system is provided which allows the lock nut to be mounted and tightened on a shaft to a specified torque and then locked into position by using one of two retaining rings; one retaining ring having a clockwise offset keeper and another retaining ring having a counterclockwise offset keeper, without necessarily adjusting the position of the nut and thus changing the desired torque on the nut. For one retaining member, the plurality of locking teeth on the keeper are offset in a clockwise direction. For another retaining member, the plurality of locking teeth on the keeper are offset in a counterclockwise direction. Each retaining member may be supplied with the lock nut and the user may select the clockwise offset or counterclockwise offset retaining member and keeper to use to lock the nut onto the shaft.

The lock nut system includes a nut having a plurality of nut teeth along an inner circumferential portion. The nut is threadably engageable with a shaft. A retaining member or ring is engageable with the nut. A keeper is coupled to the retaining member and has a plurality of locking teeth configured to engage with the nut teeth along with a protrusion configured to fit within a recess of said shaft. The locking teeth are offset relative to a centerline extending radially through the keeper so that a distance between the centerline and a first full locking tooth located on the clockwise side of the centerline is not equal to a distance between the centerline and a second full locking tooth located on the counterclockwise side of the centerline. The locking teeth engage with the nut teeth to lock the nut into position on the shaft when (i) the nut is threadably engaged to the shaft with the retaining member engaged to the nut and (ii) the protrusion is within the recess of the shaft.

In another aspect, a retaining member in the shape of a ring for a lock nut system is provided. The retaining member is useable with a nut having a plurality of nut teeth along an inner circumferential portion. The nut is threadably engageable with a shaft. The retaining member is engageable with the nut. A keeper is coupled to the retaining member and has a plurality of locking teeth configured to engage with the nut teeth. The keeper has a protrusion configured to fit within a recess of the shaft. The locking teeth are offset relative to a centerline extending radially through the keeper so that a distance between the centerline and a first full locking tooth located on the clockwise side of the centerline is not equal to a distance between the centerline and a second full locking tooth located on the counterclockwise side of the centerline. The locking teeth are configured to engage with the nut teeth to lock the nut into position on said shaft when (i) the nut is threadably engaged to the shaft with the retaining member engaged to the nut and (ii) the protrusion is within the recess of the shaft.

In yet another aspect a method is provided. The method includes providing a retaining member engageable with a nut, the nut having a plurality of nut teeth along an inner circumferential portion and being threadably engageable with a shaft; configuring a keeper with a protrusion sized to fit within a recess of the shaft and coupling the keeper to the retaining member; configuring a plurality of locking teeth on the keeper to engage with the plurality of nut teeth wherein said plurality of locking teeth are offset relative to a centerline extending radially through the keeper so that a distance between the centerline and a first full locking tooth located on the clockwise side of the centerline is not equal to a distance between the centerline and a second full locking tooth located on the counterclockwise side of the centerline. The locking teeth engage with the nut teeth to lock the nut into position on the shaft when (i) the nut is threadably engaged to the shaft with the retaining member engaged to the nut and (ii) the protrusion is within the recess of the shaft.

In some embodiments, the protrusion generally extends radially inward toward the central axis of the nut when the retaining member is engaged to the nut. The lock nut may have at least one recess configured to receive the retaining member therein. The recess may be a circular recesses extending within an inside surface of the nut. The retaining member may extend continuously in an arc when within the recess. The retaining member or ring may have at least one leg configured to be received in the circular recess. The lock nut is useable as a bearing retaining nut. The retaining member may have two legs elastically deformable toward one another to allow said retaining member to be engaged to the nut by inserting the two legs in the circular recess.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

Lock nut systems may use retaining members and/or keepers to lock the nut on a shaft, as disclosed in U.S. Pat. Nos. 8,961,090 and 8,904,646, the specifications of which are incorporated herein by reference in their entireties. Such systems may be used to lock a nut onto a shaft at a specified torque setting where the specified torque setting of the nut is calculated to affect the wheel assembly and the bearings secured by the nut. Accordingly, when the nut is torqued to such specified setting, it is not desirable to further adjust, i.e. tighten or loosen the nut, as such movement will change the specified torque setting. In prior lock nut systems which do not utilize the principles of the inventive concepts herein, in order to properly lock the nut, the retaining member, which may include a protrusion, must align with a recess such as for example a slot in the shaft. In addition, the teeth on the keeper must align with the teeth on the axle nut so that the teeth mesh and the retaining member can be properly inserted and locked to the nut. Such proper alignment can only occur if the aforementioned teeth are aligned and the retaining member is also aligned with the recess of the axle. However, frequently such alignment does not occur when the nut is torqued to a specified setting. In such prior situations and systems, in order to align the teeth of the nut and retaining member while the protrusion is aligned with the slot of the nut, the nut must be either loosened or tightened so that the teeth of the nut align with the teeth of the keeper. Such further loosening or tightening may not be desired as it will change the nut's torque setting.

In accordance with the principles of the present invention, a lock nut system engageable with a shaft is provided. The nut may be locked onto the shaft without the aforementioned further loosening or tightening of the nut. Specifically, the system utilizes more than one retaining members or rings, one having a keeper with teeth offset in a clockwise direction, and the other having a keeper with teeth offset in the counterclockwise direction. A user selects either the clockwise offset retaining member and keeper, or the counterclockwise offset retaining member and keeper to engage and lock the lock nut into place.

Figure 1A:
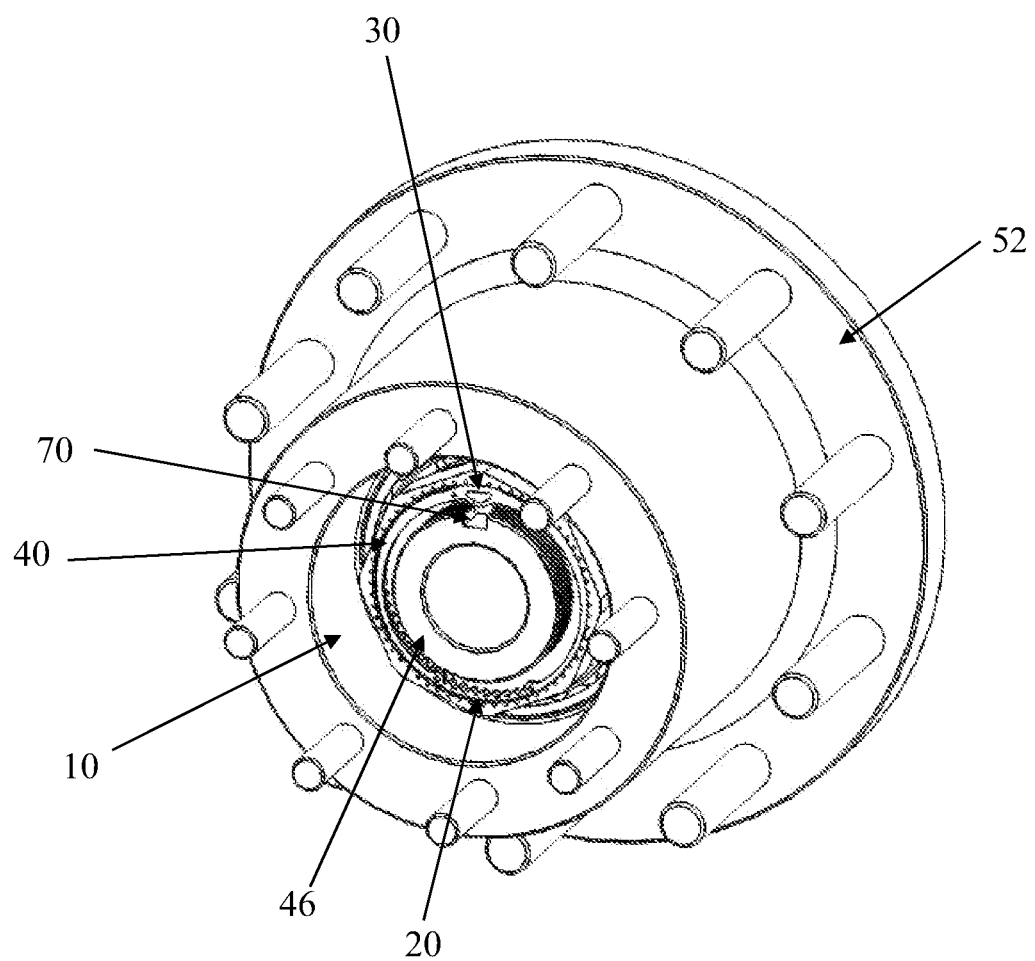
FIG. 1A is a perspective view of a lock nut system mounted on a shaft, such as an axle or spindle, to secure a wheel and bearing assembly thereon, which includes a lock nut having a keeper and a keeper retaining member engaged with the nut.
Figure 1B:
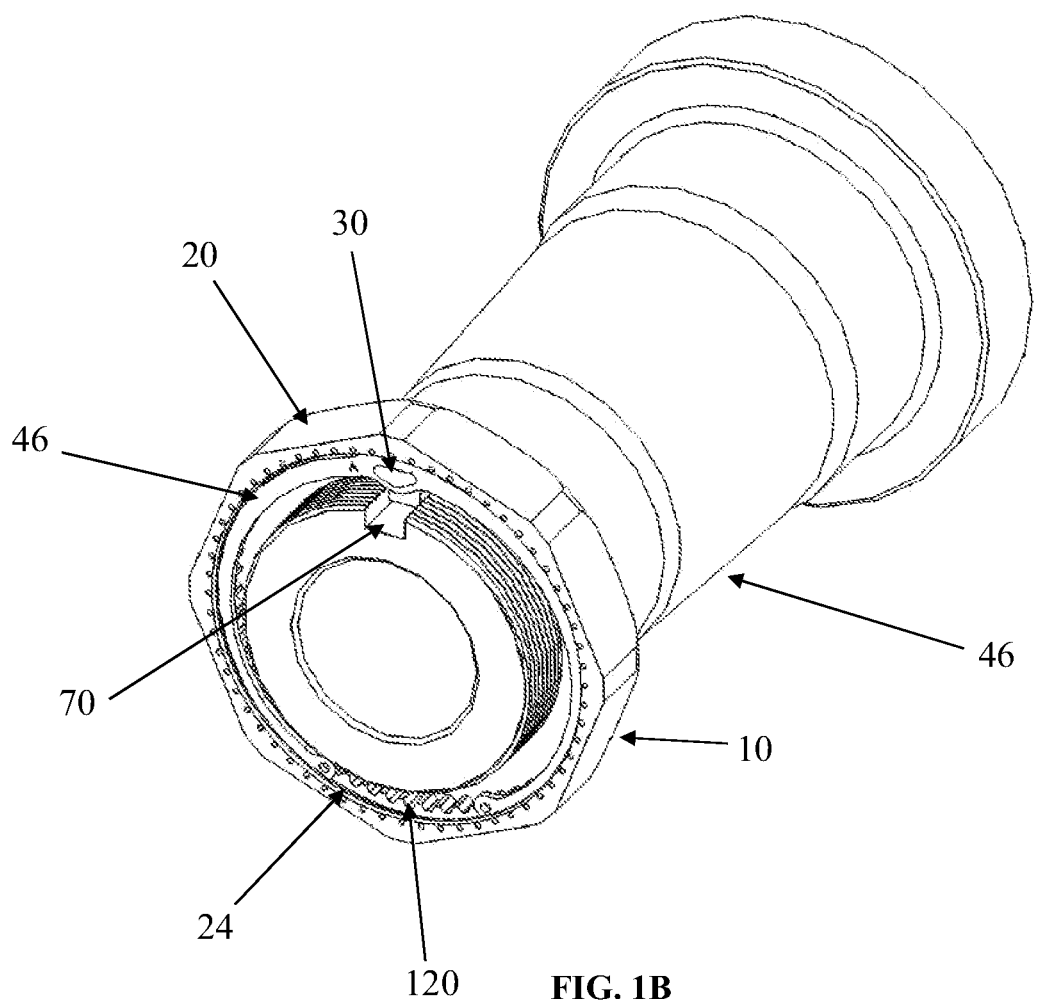
FIG. 1B is a perspective view of the lock nut system of FIG. 1A with the wheel and bearing assembly removed from the shaft.
Figure 1C:
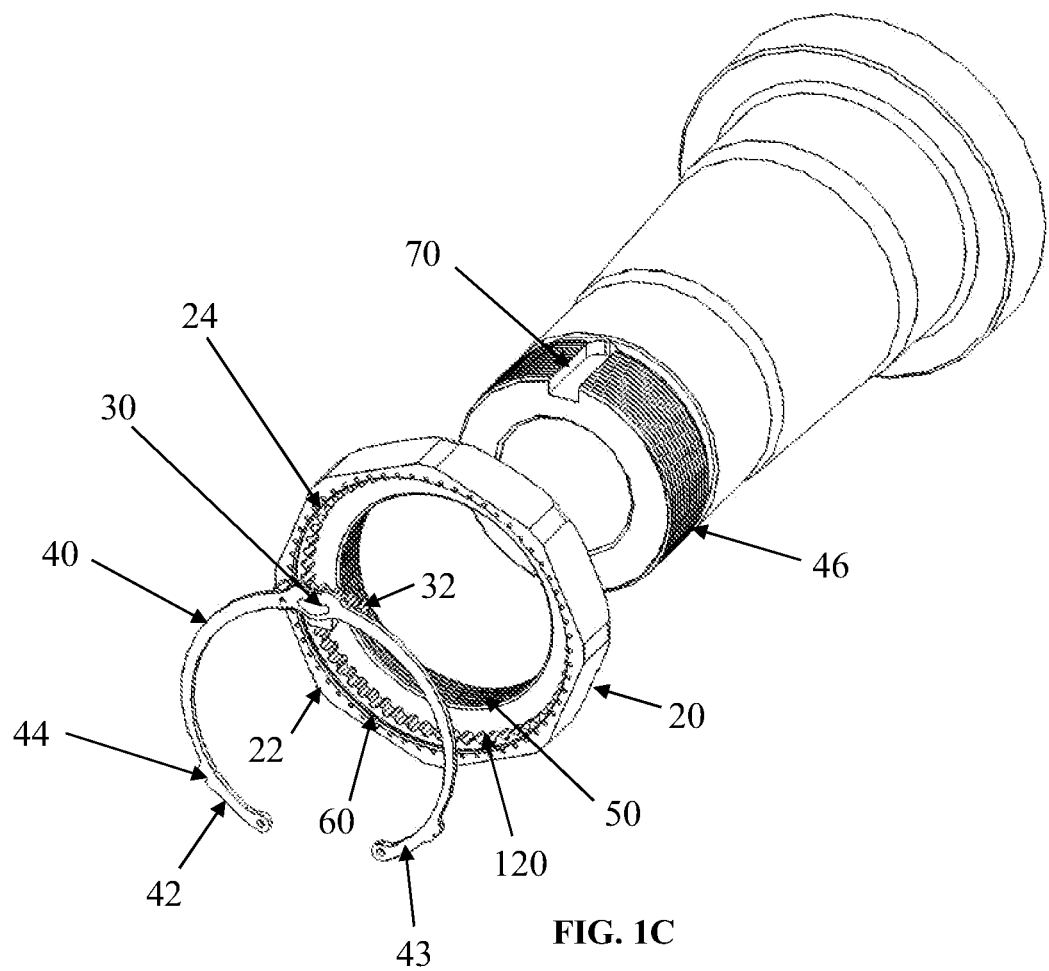
FIG. 1C is a perspective view of the lock nut system and shaft of FIGS. 1A and 1B, in a unassembled mode.

The lock nut system 10 and nut 20, as shown in FIG. 1A, often function as a bearing retaining nut to secure a bearing assembly and wheel 52 on shaft 46, typically an axle or a spindle. FIGS. 1B and 1C depict where the wheel and bearing assembly have been removed for simplicity. Referring to FIGS. 1A-1C, the nut 20, in certain applications, may be desired to be tightened to a specified torque in order to impart such specified torque to a bearing and/or bearing assembly. For example, in certain applications, such as tractor or truck drive axles, the lock nut is specified to be torqued to approximately 500 foot pounds so as to maintain such torque on the bearing of a bearing assembly along with a wheel on an axle or spindle. In certain embodiments, the lock nut may include a recessed surface facing the bearing. However, in other embodiments and applications, a recessed surface is not included in the nut. The lock nut(s) shown in U.S. Pat. Nos. 8,961,090 and 8,904,646 are useable in connection with the invention.

In accordance with the principles of the present invention, in order to achieve alignment between the teeth 120 of the nut and the teeth 320 of the keeper without further rotation of the nut on the shaft, the system includes more than one retaining member 40, as shown in FIGS. 3A-3C and 4A-4C, namely a first retaining member 40 with a keeper with teeth offset in a clockwise direction as shown in FIGS. 2A and 3A-3C, and a second retaining member 40 with a keeper with teeth offset in a counterclockwise direction as shown in FIGS. 2B and 4A-4C. Use of one of the clockwise or counterclockwise offset keeper or retaining member will allow the teeth of the keeper 30 to align with the teeth of the nut 120. In this situation, the nut need not be adjusted, by loosening or tightening in order to lock the retaining member and keeper into the lock nut. Thus, the specified torque of the nut when applied to the shaft may be maintained. Rather, either the retaining ring 40 with the clockwise offset keeper or the retaining ring with the counterclockwise offset keeper will fit into the lock nut, depending on the rotational position of the lock nut on the shaft.

In an exemplary embodiment, a lock nut system 10 includes a nut 20, a keeper 30 and a retaining member 40, as depicted in FIGS. 1A-1C. Lock nut system 10 may be useable on a shaft 46. In particular, threads 50 of nut 20 may engage threads of the shaft 46. Keeper 30 and retaining member 40 may engage nut 20 and keeper 30 may engage the shaft 46 to inhibit movement of the shaft relative to nut 20.

Referring to FIGS. 1A-1E, nut 20 may include a plurality of nut engaging teeth 120 extending circumferentially around an inner radial surface of nut 20. For example, nut 20 may include 60 engaging teeth. As shown in FIGS. 1B and 1C, nut 20 may also include a shoulder 24 configured to receive keeper 30. For example, shoulder 24 may extend circumferentially and face in the axial direction opposite the wheel bearing and assembly. The shoulder 24 may be spaced from an outer surface 22 of nut 20 in an axial direction relative to nut 20 such that keeper 30 is received between outer surface 22 and shoulder 24. Shoulder 24 may also abut and support keeper 30 in an axial direction. Nut 20 may be molded or formed of powdered metal, for example. As described below, shoulder 24 of the nut 20 may include a slot 60 to receive the retaining member 40.

Figure 1D:
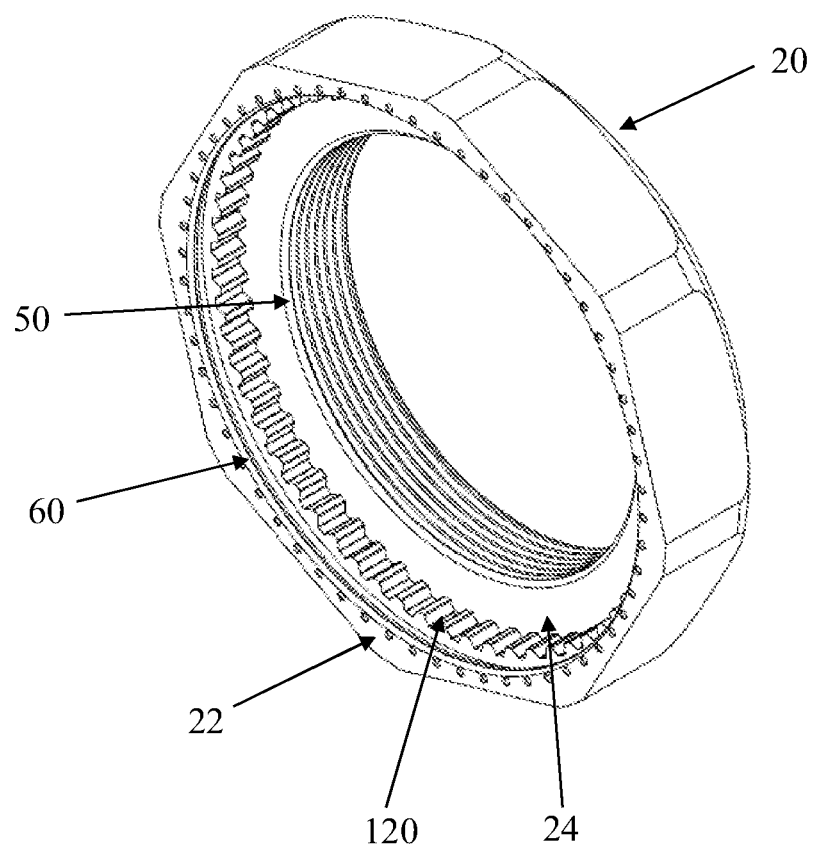
FIG. 1D is a perspective view of the lock nut of FIGS. 1A-1C without the retaining member and keeper.
Figure 1E:
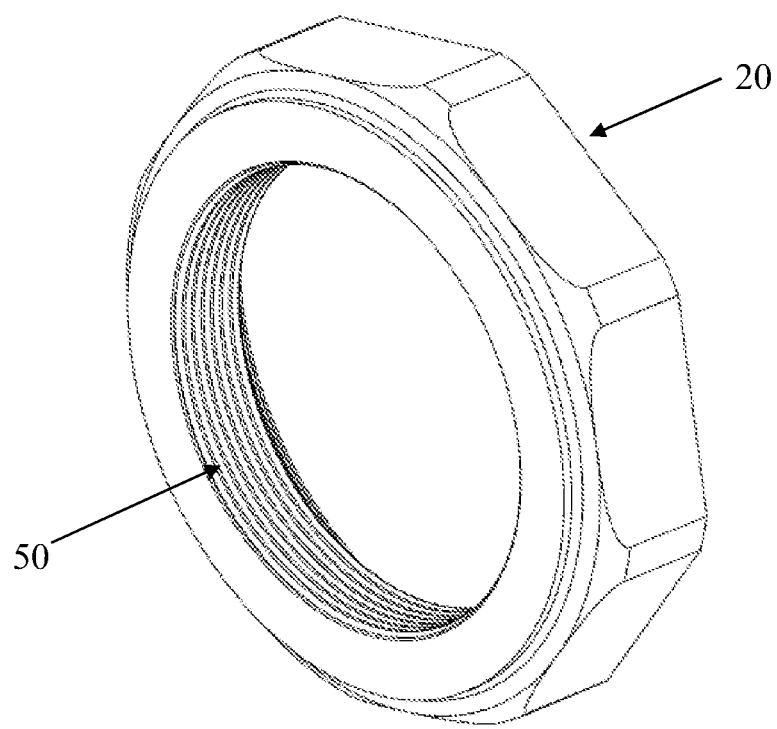
FIG. 1E is a perspective view of the opposite side of the nut of FIG. 1D.

Referring to FIG. 1D and FIG. 2, nut 20 may include a slot 60 extending circumferentially (e.g., completely or partially) around nut 20. Slot 60 may be located between nut engaging teeth 120 and outer surface 22 of nut 20. Also, slot 60 may have a radial depth sufficient to receive and retain retaining member 40. Retaining member 40 may engage slot 60. For example, a first leg 42 and a second leg 43 may be received in slot 60. Further, a tab 44 of retaining member 40 (shown in FIG. 1C) may be received in slot 60.

Figure 2A:
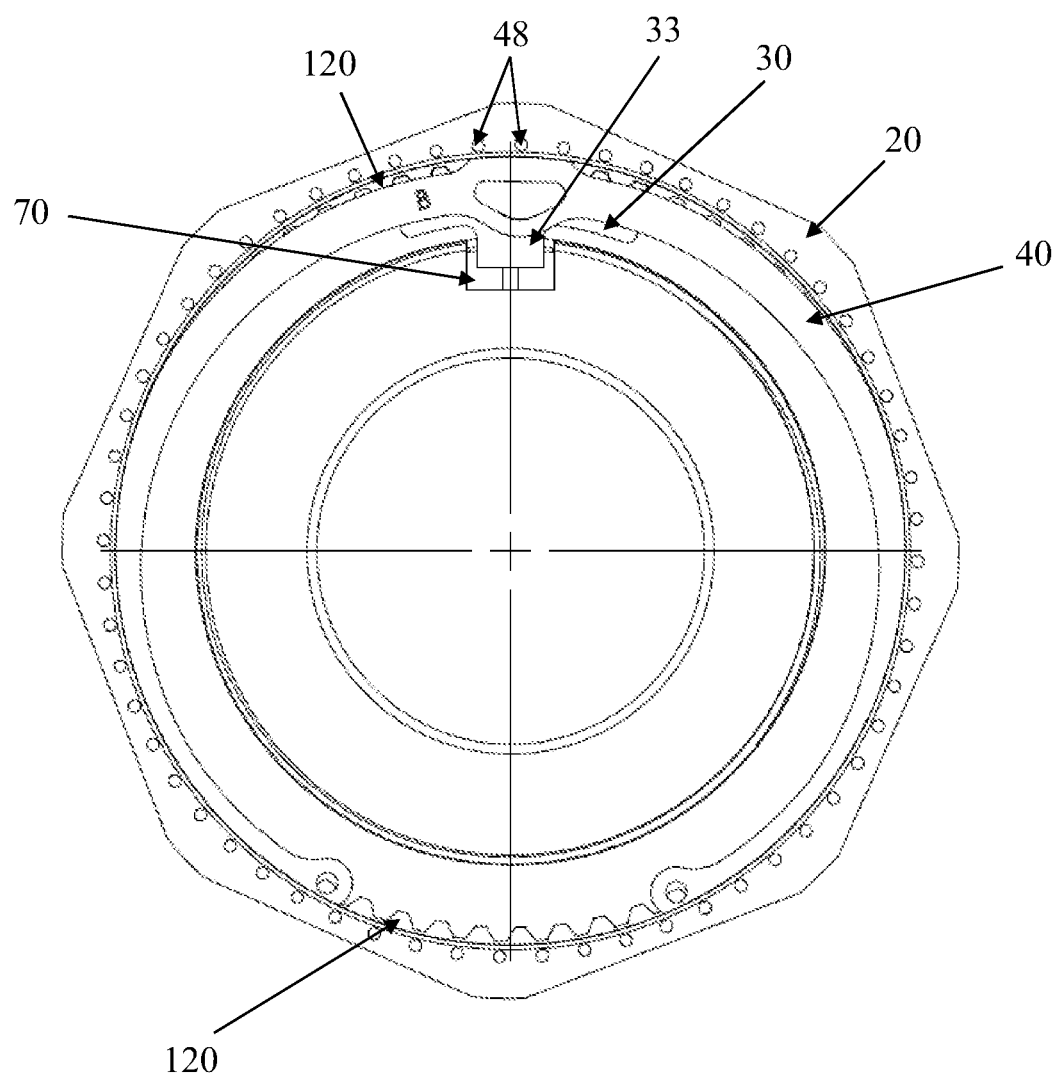
FIGS. 2A and 2B are front views of the lock nut system of FIG. 1A-1C with the retaining member having a keeper offset in opposite clockwise and counterclockwise directions, respectively.
Figure 2B:
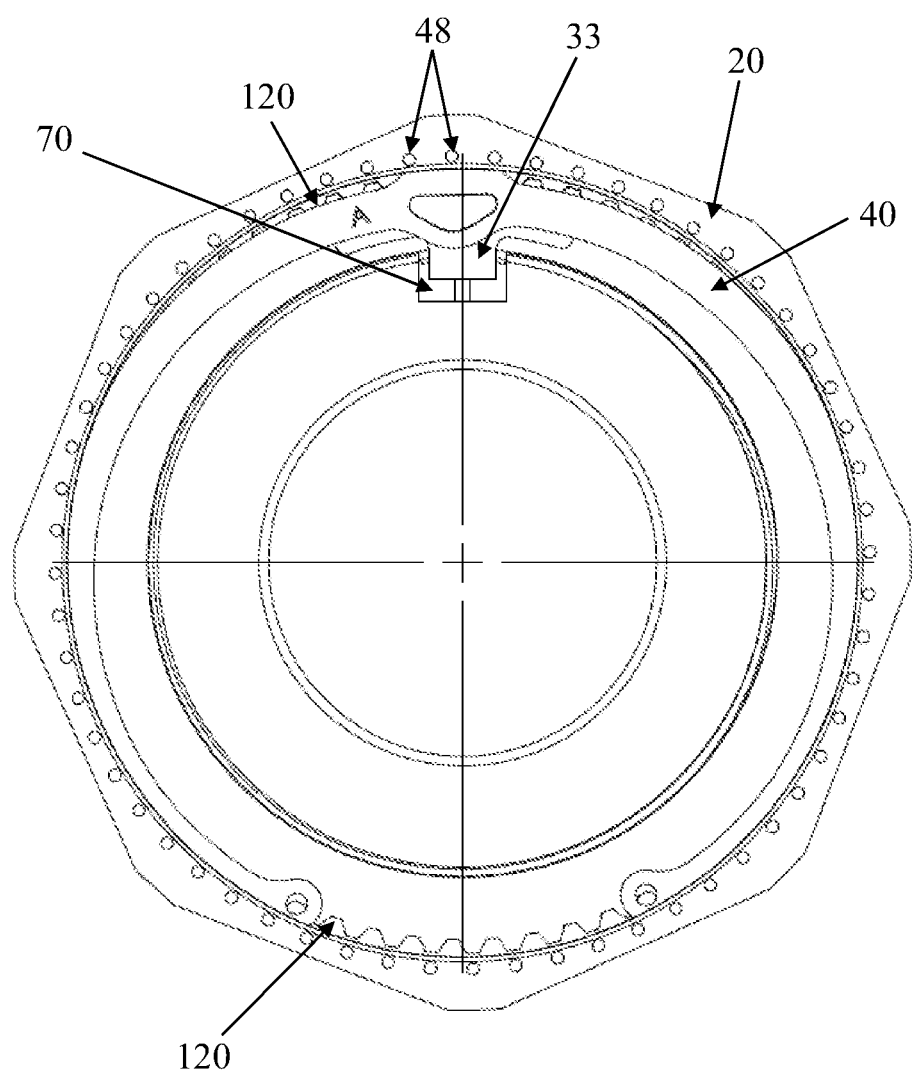
Figure 3A:
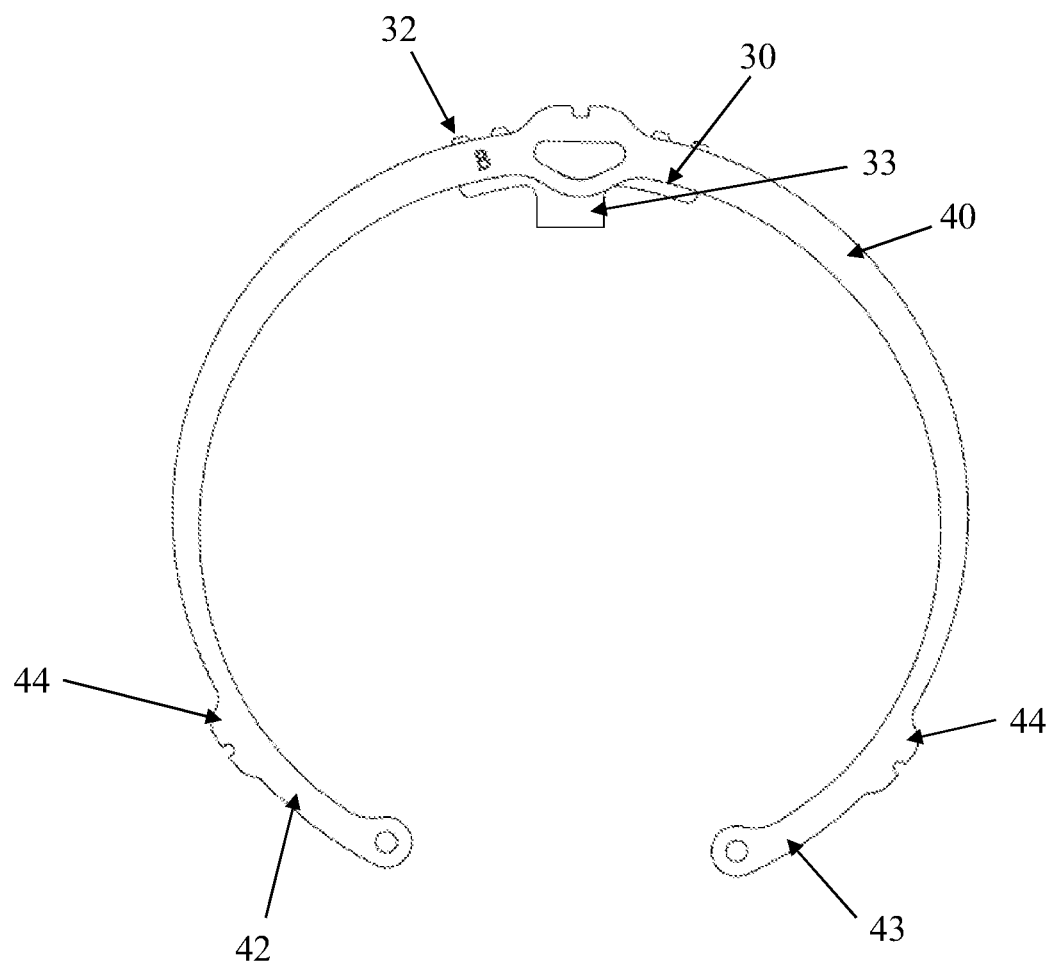
FIG. 3A-3C are front, back and side views, respectively, of the retaining member with a keeper having a clockwise offset useable in the lock nut system shown in FIG. 1A-1C.
Figure 3B:
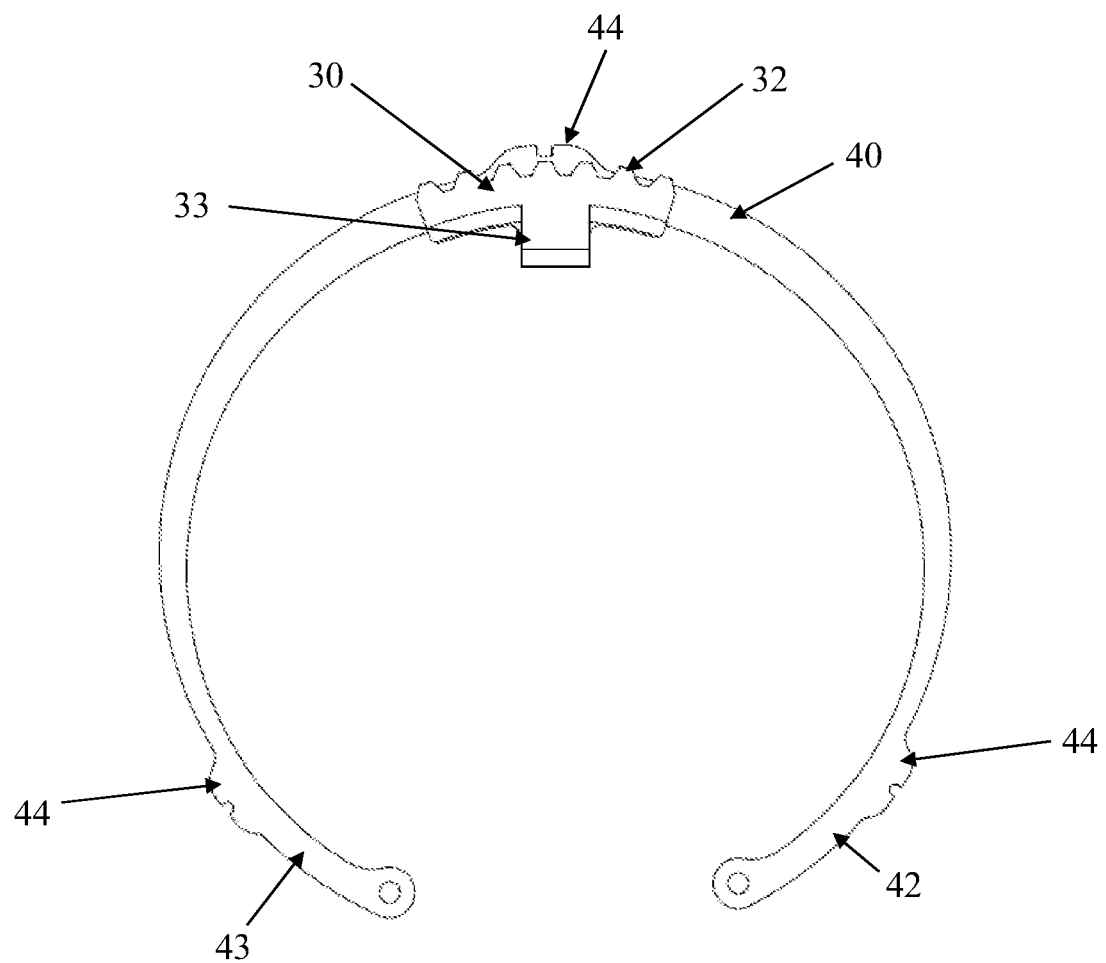
Figure 3C:
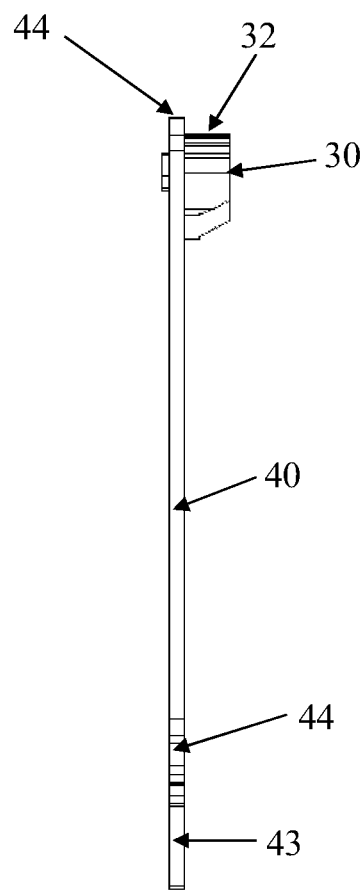
Figure 4A:
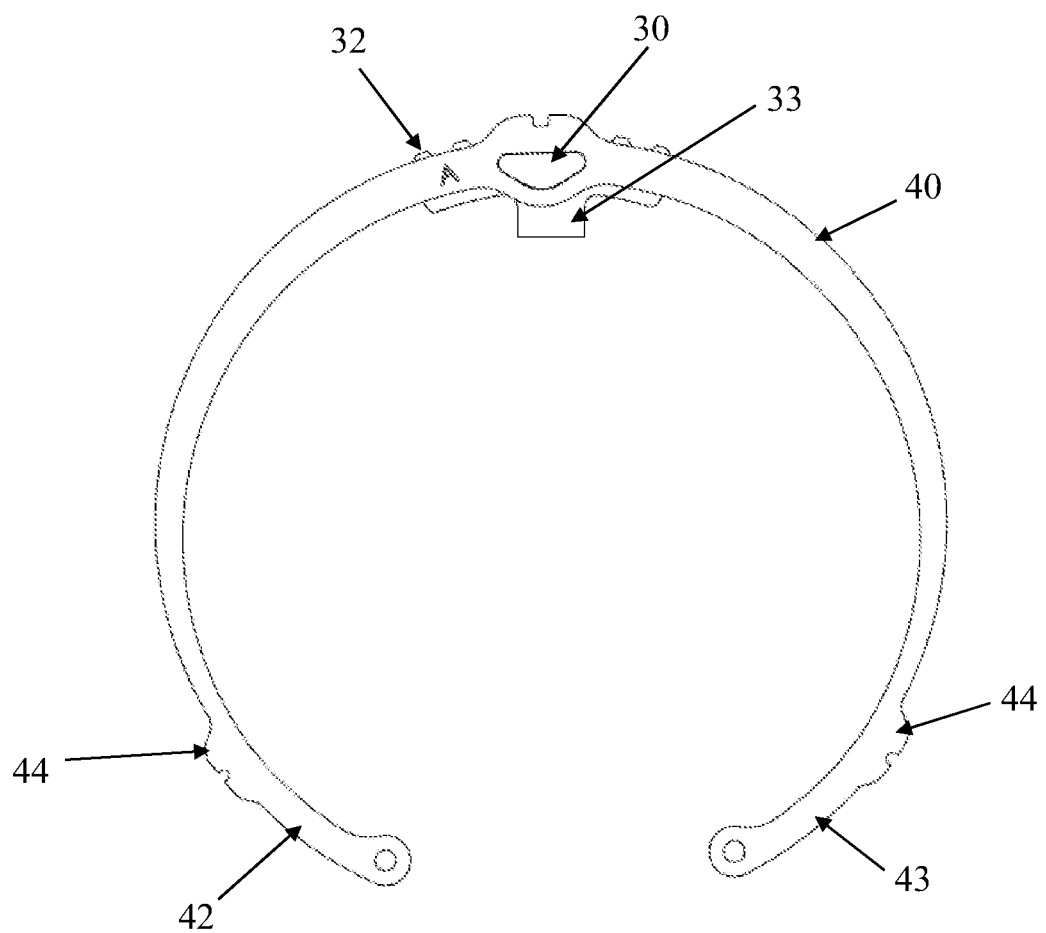
FIG. 4A-4C are front, back and side views, respectively, of the retaining member with a keeper having a counterclockwise offset useable in the lock nut system shown in FIG. 1A-1C.
Figure 4B:
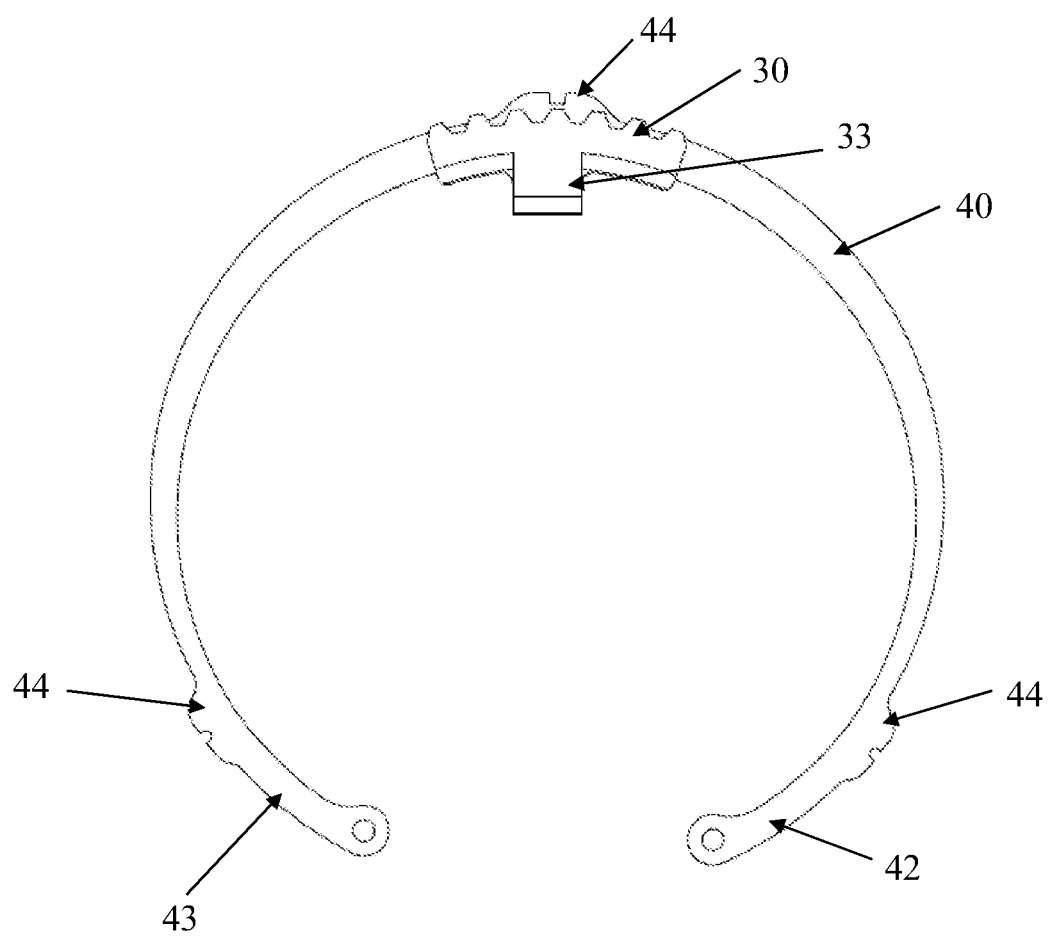
Figure 4C:
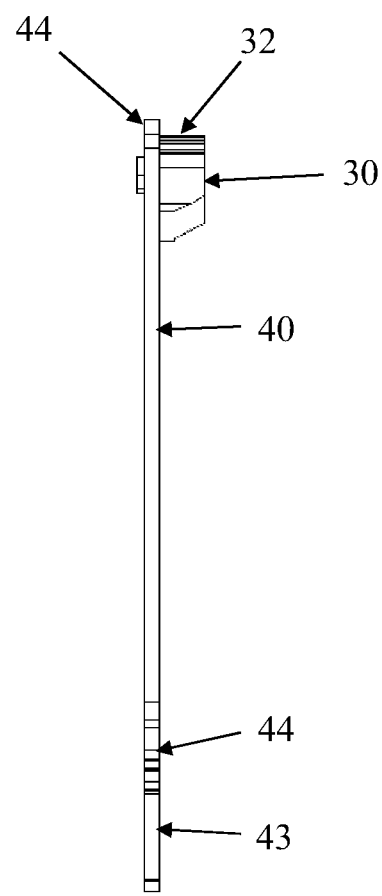

As shown in FIGS. 1C, 3A and 4A, keeper 30 may include a plurality of keeper teeth 32 configured to engage nut engaging teeth 120 of nut 20 such that movement between keeper 30 and nut 20 is inhibited when keeper teeth 32 and nut engaging teeth 120 are engaged to each other, such as when the retaining member 40 and keeper 30 are locked onto the nut as shown in FIGS. 1A, 2A and 3A. Referring to FIGS. 2A and 2B, retaining member 40 may include a shaft engaging side having, for example, a protrusion 33 configured (e.g., shaped and dimensioned) to engage a shaft 46 by for example fitting within a recess such as, for example, a slot 70 on the shaft 46 to inhibit movement (e.g., rotational movement) of the shaft relative to keeper 30. When threads 50 of nut 20 engage threads of the shaft, keeper teeth 32 may engage nut engaging teeth 120, and keeper retaining member 40 may engage slot 60. For example, the engagement or meshing of keeper teeth 32 and nut engaging teeth 120 inhibits movement of keeper 30 relative to nut 20 and the engagement of engaging side 33 with the shaft inhibits movement between keeper 30 and the shaft thereby inhibiting movement between nut 20 and the shaft. Keeper 30 may include, for example, about seven keeper teeth 32 evenly spaced from one another, for example. Also, keeper teeth 30 on outer circumferential sides 35 of keeper 30 may have an axial height (i.e., relative to nut 20) substantially equal to a distance from shoulder 24 to outer surface 22. Keeper teeth 32 on an inner portion of keeper 30 may have a height substantially equal to a distance from shoulder 24 to slot 60 thereby allowing tab 44 of retaining member 40 to extend into slot 60. More specifically, keeper teeth 32 on an inner portion have an axial height less than keeper teeth 32 on outer sides 35. The reduced axial height on inner portion allow tab 44 to pass over teeth 32 to extend into slot 60.

In a further unillustrated embodiment, keeper 30 could extend partially or entirely circumferentially around nut 20 (e.g., abutting shoulder 24) and could include keeper teeth 32 around an entire outer circumference of keeper 30, which therefore could engage some or all of engaging teeth 120.

Retaining member 40 may be elastically deformable to allow it to be received in slot 60. For example, first leg 42 and second leg 43 may be deformed (e.g., in a direction substantially perpendicular to the axis of nut 20) toward one another prior to being inserted axially past outer surface 22 of nut 20 to allow retaining member 40, and keeper 30 to be attached thereto. First leg 42 and second leg 43 may then be elastically returned toward slot 60. For example, retaining member 40 may be formed of ASTM A228 spring steel as will be understood by those skilled in the art. Also, retaining member 40 may be cylindrical or otherwise arcuately shaped. Alternatively, retaining member 40 could be formed of other materials and/or formed in other shapes to allow retaining member 40 to receive in slot 60 and/or cavities (e.g. cavity 36 and cavity 38) of keeper 30.

As shown in FIGS. 2A and 2B, keeper 30 functions to engage with the teeth 120 of the lock nut 20 so as to allow the retaining member 40 to fit into slot 60 of the nut and lock the nut 20 into position on the shaft 46. Further, keeper 30 may be formed or molded of powdered metal, for example. Also, keeper 30 could be formed in different shapes to allow it to engage a shaft to thereby inhibit movement of such shaft. For example, shafts may have different shaped recesses and the keeper 39 should be shaped so that its protrusion 33, for example, fits within the recess to prevent relative rotation therebetween.

Retaining member 40 when received in slot 60 may align keeper 30 such that keeper teeth 32 are engaged with the nut teeth 120. Further, retaining member 40 when received in slot 60 provides resistance in an axial direction relative to nut 20 thereby inhibiting movement of keeper 30 axially away from shoulder 24 toward outer surface 22.

In one aspect of the invention, the lock nut system includes a retaining member having a keeper offset in the clockwise direction as shown in FIGS. 2A, 3A-3C. Referring to these aforementioned figures, the keeper teeth which function as locking teeth to mesh with the nut teeth are offset in a clockwise direction. The direction of offset is, for example, relative to a center line extending from the center of the shaft radially through the center of the protrusion 33 of the keeper. The distances between the center line and two adjacent locking teeth on the keeper, each located on each side of the center line are not equal. This clockwise offset keeper used on the retaining member will fit onto a lock nut threaded onto the shaft where the teeth of the lock nut are rotated slightly past the center line extending radially through the keeper from the center of the shaft vertically through the center or middle of the protrusion of the keeper. In other words, the retaining member with the clockwise offset keeper will fit a lock nut where the space between the center line and the first full nut tooth located clockwise from the center line is greater than the distance between the center line and the first full nut tooth located counterclockwise from the center line.

In one aspect of the invention, the lock nut system includes a retaining member having a keeper offset in the clockwise direction as shown in FIGS. 2B, 4A-4C. Referring to these aforementioned figures, the keeper teeth which function as locking teeth to mesh with the nut teeth are offset in a counterclockwise direction. The direction of offset is, for example, relative to a center line extending from the center of the shaft radially through the center of the protrusion 33 keeper. The distances between the center line and two adjacent locking teeth on the keeper, each located on each side of the center line are not equal. This counterclockwise offset keeper used on the retaining member will fit onto a lock nut threaded onto the shaft where the teeth of the lock nut are not rotated slightly past the center line extending radially through the keeper from the center of the shaft vertically through the center or middle of the protrusion 33 of the keeper. In other words, the retaining member with the counterclockwise offset keeper will fit a lock nut where the space between the center line and the first full nut tooth located clockwise from the center line is less than the distance between the center line and the first full nut tooth located counterclockwise from the center line.

Referring to FIG. 2A, the nut 20 is marked with a plurality of marks 48, which, for example, may be in the form of dots or any other form. The marks are equidistantly spaced on the outer surface of the nut to assist the user in determining if a clockwise offset retaining member or a counterclockwise retaining member should be used to lock the nut 20 onto the shaft 46. In one embodiment, as shown, each mark 48 is located at a position on a radial line in the middle of, and equidistant between, adjacent nut teeth 120. Also, each mark 48 is located at a position on a radial line extending from the center of the shaft to the middle of a gap between nut teeth 120, and in the middle of a radial line extending from the center of the shaft through the center of a corresponding locking tooth 32 which fits within such gap.

Thus, as shown in FIG. 2A, if a center line extending radially from the center of the shaft 46 and the middle of the protrusion 33 (or key) is located slightly to the left of the nearest mark 48 to such center line, a clockwise offset retaining member and keeper should be used to, and will, lock the nut by engaging the locking teeth 33 of the keeper of the retaining member into the nut teeth while the protrusion 33 is located within the recess or keyway. Conversely, if as shown in FIG. 2B, if the same center line is located slightly to the right of the nearest mark 48, a counterclockwise offset retaining member and keeper should be used to, and will, lock the nut by engaging the locking teeth 33 of the keeper 30 with the nut teeth 120 when the protrusion 33 or key is located in the recess or keyway. Thus, the markings 48 assist the user in determining which retaining member, a clockwise offset (FIG. 2A) or a counterclockwise offset (FIG. 2B), should be used.

In accordance with the principles of the present invention, the axle nut 20 is installable on the shaft 46 using the following process. Lock nut 20, without retaining member 40 or keeper engaged thereto, is threadably mounted onto a shaft 46. The shaft will typically contain a wheel and bearing assembly thereon. If the lock nut is to be tightened to a desired torque, which may be specified by wheel end manufacturers or suppliers, the nut 20 is tightened to such torque. Typically, the range of torques specified for truck wheel ends ranges between 350 and 500 foot pounds. For different wheel end assemblies, manufacturers and suppliers may specify different lock nut installation and bearing setting procedures. Such procedures should be typically followed using the lock nut disclosed herein. Once such procedures are completed and the lock nut is tightened to a specified torque, the retaining member may be installed and assembled to be engaged into the lock nut.

As depicted in the figures herein, the legs 42, 43 of the lock nut may include openings for the use of retaining ring pliers to contract the radius or circumference of the ring. However, alternatively the legs may include tabs which allow the radius of the retaining member to be compressed by hand without the use of tools.

The retaining member 40 with the clockwise offset keeper or the counterclockwise offset keeper may be inserted into the slot 60 of the nut 20 with the protrusion 33 inserted into the recess 70 of the axle. With the protrusion 33 inserted into the axle recess 70 and the retaining member 40 placed into the lock nut 20 slot 60, the teeth 32 on the selected keeper may or may not align with the teeth 120 of the nut 20 such that the teeth 32 and 120 interlock or mesh with one another (as shown in FIG. 2A or 2B).

If the retaining member with the clockwise offset keeper teeth align properly and mesh with the nut teeth insertion of the retaining member 40 into the slot 60 of the nut will place the lock nut in the locked and assembled position, without rotation of the nut and disruption of the torque previously applied to the nut. However, if the teeth 32 of the clockwise offset keeper do not align with the teeth 120 of the nut such that the teeth do not mesh with one another, the retaining member with the counterclockwise offset keeper 30 may be used to lock the lock nut into place. Also, it may be possible for the user to visually inspect the rotational position of the lock nut on the shaft to determine if the clockwise or counterclockwise offset keeper and retaining member should be used. With this procedure, the nut need not be loosened or tightened in order to align the teeth of the keeper 32 with the teeth of the teeth 120 of the nut 20. Accordingly, with this procedure the nut need not be further adjusted to be locked into place on the shaft so there is no adjustment or change in the torque applied by the nut onto the wheel end and/or bearing assembly.

Use of molded metals (e.g., powdered metal) as described above for the nuts and keepers allows a finer spacing of teeth than other materials (e.g., sheet metal keepers) and methods thereby allowing finer adjustment of nuts, keepers, and shafts relative to each other, while preventing or inhibiting movement of the keeper relative to the nuts. For example, the use of powdered metal instead of stamped sheet metal for a keeper allows a higher number of keeper teeth to be provided per unit area thereby allowing more engagement with corresponding engagement teeth on the nut. The ability of the molded teeth in the present invention to resist torque is significantly higher than that afforded by a stamped part of previous inventions because of the ability to economically mold teeth with greater axial dimensions as well as the ability to include a greater number of engaging teeth per unit area, when using powdered metal instead of stamped sheet metal. A finer adjustment may be therefore be provided of the keeper relative to the nut due to such increased number of keeper teeth and corresponding increased number of engaging teeth of a nut per unit area. For example, a finer adjustment of bearing clearance can be achieved with the use of the finer pitch of the molded teeth. Further, the use of molded metals (e.g., powdered metals) for keeper 30 allows it to engage a shaft without being significantly deformed or significantly deforming the shaft in contrast to other materials used for this purpose (e.g., stamped sheet metal) which may deform after a period in use or cause deformation (e.g., stripped threads) of a shaft to which it is engaged. Additionally, such a molded keeper may be harder and stronger than a stamped sheet metal keeper thereby inhibiting such damage. Thus, a higher torque loading may be provided utilizing molded metals (e.g., powdered metal) relative to other materials (e.g., a sheet metal stamped keeper) to form keepers and nuts and without resulting in failure, i.e., a risk of damage to the shaft or axle due to over torque is minimized. Also, keepers may resist deformation when engaged with a slot of a shaft for the same reasons.

Although the above-described lock nuts and keepers are described as being molded or formed of powdered metal, these nuts and keepers could be die cast, molded of other materials, or formed in any other manner which would allow the teeth of the keeper and nut to inhibit movement relative to each other along with the keeper and shaft inhibiting movement relative to one another. Also, the retaining member could be formed of sheet metals or the same materials as the keepers and/or nuts. Such retaining members could also be formed of plastic or any other material which would axially hold a keeper (e.g., keeper 30) such that the keeper teeth thereof (e.g., keeper teeth 32) are engaged with nut engaging teeth (e.g., engaging teeth 120) of a nut (e.g., nut 20). For example, such retaining members could be formed of plastics which satisfy this criteria.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A lock nut system comprising:
   a nut comprising an inner circumferential portion having a plurality of nut teeth and an inner recess positioned axially between the plurality of nut teeth and an outer face of the nut, and an internal threaded portion being threadably engageable with a shaft positioned between the nut teeth and another outer face of the nut;
   a retaining member engageable with the nut, said retaining member including a plurality of locking teeth configured to engage with said plurality of nut teeth, a protrusion configured to fit within a recess of said shaft, and at least one leg configured to be received in said inner recess;
   wherein said plurality of locking teeth are offset relative to said protrusion so that a first distance between the protrusion and a first full locking tooth located on a clockwise side of the protrusion is not equal to a second distance between the protrusion and a second full locking tooth located on a counterclockwise side of the protrusion; and
   wherein said locking teeth are configured to engage with said nut teeth to lock said nut into position on said shaft when (i) the nut is threadably engaged to the shaft with the retaining member engaged to the nut and (ii) the protrusion is within the recess of the shaft.

2. The lock nut system of claim 1, wherein said protrusion extends radially inward toward the central axis of said nut when said retaining member is engaged to said nut.

3. The lock nut system as recited in claim 1, wherein the inner recess comprises a circular recess.

4. The lock nut system as recited in claim 3, wherein the retaining member extends continuously in an arc when within said inner recess and engaged with said nut.

5. The lock nut system as recited in claim 4, wherein the nut comprises a bearing retaining nut.

6. The lock nut system of claim 1, wherein the plurality of locking teeth are offset in a clockwise direction such that the first distance is greater than the second distance.

7. The lock nut system of claim 1, wherein the plurality of locking teeth are offset in a counterclockwise direction such that the second distance is greater than the first distance.

8. The lock nut system of claim 1, wherein said at least one leg comprises two legs elastically deformable toward one another to allow said retaining member to be engaged to said nut by inserting said two legs in said inner recess.

9. The lock nut system of claim 1, wherein the inner recess is positioned axially adjacent to the plurality of nut teeth of the nut.

10. A retaining apparatus for lock nut system useable with a nut comprising an inner circumferential portion having a plurality of nut teeth and an inner recess positioned axially between the plurality of nut teeth and an outer face of the nut, and an internal threaded portion being threadably engageable with a shaft positioned between the nut teeth and another outer face of the nut, the apparatus comprising:
   a retaining member engageable with the nut, said retaining member having a plurality of locking teeth configured to engage with said plurality of nut teeth, a protrusion configured to fit within a recess of said shaft, and at least one leg configured to be received in said inner recess;
   wherein said plurality of locking teeth are offset relative to said protrusion so that a first distance between the protrusion and a first full locking tooth located on a clockwise side of the protrusion is not equal to a second distance between the protrusion and a second full locking tooth located on a counterclockwise side of the protrusion; and
   wherein said locking teeth are configured to engage with said nut teeth to lock said nut into position on said shaft when (i) the nut is threadably engaged to the shaft with the retaining member engaged to the nut and (ii) the protrusion is within the recess of the shaft.

11. The lock nut system of claim 10, wherein said protrusion extends radially inward toward the central axis of said nut when said retaining member is engaged to said nut.

12. The lock nut system as recited in claim 11, wherein the retaining member extends continuously in an arc.

13. The lock nut system of claim 10, wherein the plurality of locking teeth are offset in a clockwise direction such that the first distance is greater than the second distance.

14. The lock nut system of claim 10, wherein the plurality of locking teeth are offset in a counterclockwise direction such that the second distance is greater than the first distance.

15. The lock nut system of claim 10, wherein the at least one leg is received within said inner recess when the retaining member is engaged to the nut.

16. The lock nut system of claim 10, wherein the at least one leg comprises two legs elastically deformable toward one another to allow said retaining member to be engaged to said nut by inserting said two legs in said inner recess.

17. A method comprising:
   providing a retaining member engageable with a nut, the nut comprising an inner circumferential portion having a plurality of nut teeth and an inner recess positioned axially between the plurality of nut teeth and an outer face of and an internal threaded portion, the nut being threadably engageable with a shaft positioned between the nut teeth and another outer face of the nut;
   configuring the retaining member with a protrusion sized to fit within a recess of said shaft and at least one leg configured to be received in said inner recess;
   configuring the retaining member with a plurality of locking teeth to engage with the plurality of nut teeth wherein said plurality of locking teeth are offset relative to the protrusion a so that a first distance between the protrusion and a first full locking tooth located on a clockwise side of the protrusion is not equal to a second distance between the protrusion and a second full locking tooth located on a counterclockwise side of the protrusion; and
   wherein said locking teeth engage with said nut teeth to lock said nut into position on said shaft when (i) the nut is threadably engaged to the shaft with the retaining member engaged to the nut and (ii) the protrusion is within the recess of the shaft.

18. The method of claim 17, wherein said protrusion extends radially inward toward the central axis of said nut when said retaining member is engaged to said nut.

19. The method of claim 17, wherein the plurality of locking teeth are offset in a clockwise direction such that the first distance is greater than the second distance.

20. The method of claim 17, wherein the plurality of locking teeth are offset in a counterclockwise direction such that the second distance is greater than the first distance.

21. A lock nut system comprising:
- a nut having a plurality of nut teeth along an inner circumferential portion, said nut being threadably engageable with a shaft;
- a first retaining member engageable with the nut comprising a plurality of locking teeth configured to engage with said plurality of nut teeth and a protrusion configured to fit within a recess of said shaft; and
- a second retaining member engageable with the nut comprising a plurality of locking teeth configured to engage with said plurality of nut teeth and a protrusion configured to fit within a recess of said shaft,
- wherein the plurality of locking teeth of the first retaining member are offset relative to the protrusion thereof in a clockwise direction such that a first distance between the protrusion and a first full locking tooth located on a clockwise side of the protrusion is greater than a second distance between the protrusion and a second full locking tooth located on a counterclockwise side of the protrusion,
- wherein the plurality of locking teeth of the second retaining member are offset relative to the protrusion thereof in a counterclockwise direction such that a second distance between the protrusion and a first full locking tooth located on a counterclockwise side of the protrusion is greater than a first distance between the protrusion and a second full locking tooth located on a clockwise side of the protrusion, and
- wherein said locking teeth of the first and second retaining members are configured to engage with said nut teeth to lock said nut into position on said shaft when (i) the nut is threadably engaged to the shaft with the first or second retaining member engaged to the nut and (ii) the protrusion of the first or second retaining member is within the recess of the shaft.

22. The lock nut system of claim 21, wherein the inner circumferential portion of the nut further comprises an inner recess positioned axially between the plurality of nut teeth and an outer face of the nut, an internal threaded portion of the nut being positioned between the nut teeth and another outer face of the nut, and the retaining member further comprises at least one leg configured to be received in said inner recess when the retaining member is engaged to the nut.

* * * * *